United States Patent [19]
Spearman

[11] Patent Number: 5,239,811
[45] Date of Patent: Aug. 31, 1993

[54] ANTI-WRAP BLADES FOR LINE TRIMMER

[75] Inventor: Ernest H. Spearman, Cowen, W. Va.

[73] Assignee: Melvin Pierce, Semmes, Ala. ; a part interest

[21] Appl. No.: 833,534

[22] Filed: Feb. 10, 1992

[51] Int. Cl.⁵ .............................................. A01D 50/02
[52] U.S. Cl. ...................................... 56/12.1; 56/12.7; 56/DIG. 9; 30/276
[58] Field of Search .................... 56/12.1, 12.7, 13.6, 56/13.7, 234, 1, 17.5, 255, 295, DIG. 9, DIG. 17; 30/276

[56] References Cited

U.S. PATENT DOCUMENTS

| | | | |
|---|---|---|---|
| 4,249,310 | 2/1981 | Secoura et al. | 30/276 |
| 4,630,371 | 12/1986 | Graham | 56/12.7 X |
| 5,060,383 | 10/1991 | Ratkiewich | 30/276 |

*Primary Examiner*—Terry Lee Melius
*Attorney, Agent, or Firm*—James B. Middleton

[57] ABSTRACT

Secondary cutting blades are mounted on a line trimmer between the hub carrying the cutting line and the shield. The cutting blades extend parallel to the axis of rotation of the hub carrying the cutting line. The blades have one end adjacent to the periphery of the hub, and the other end supported at or above the shield. Tall grass or other long stalks will therefore be cut by the blades and unable to wrap around the trimmer.

7 Claims, 1 Drawing Sheet

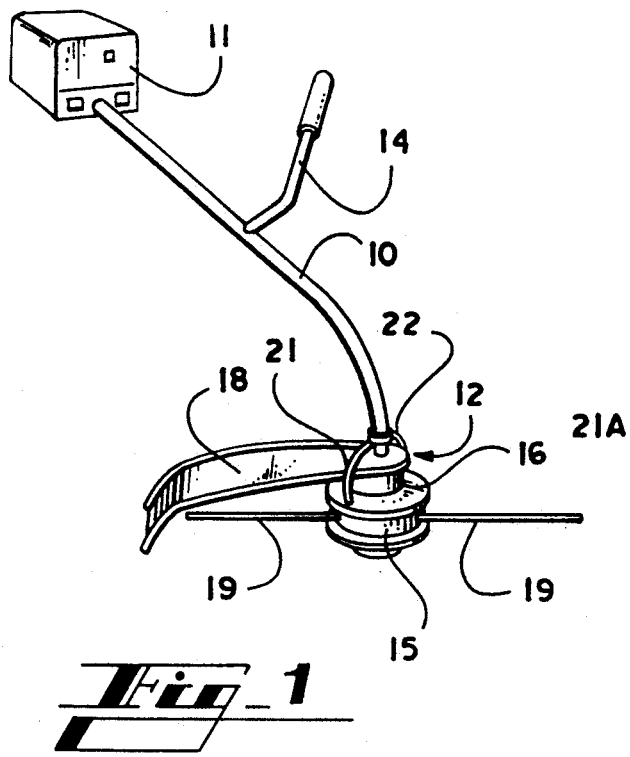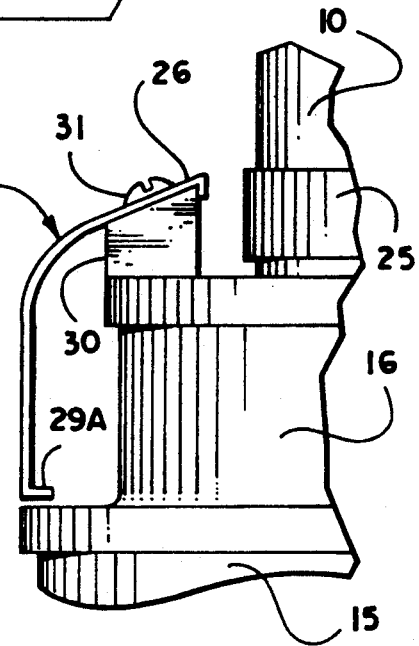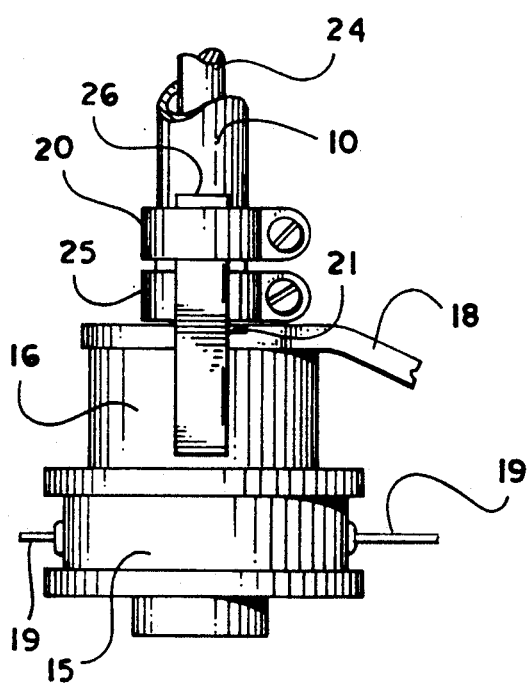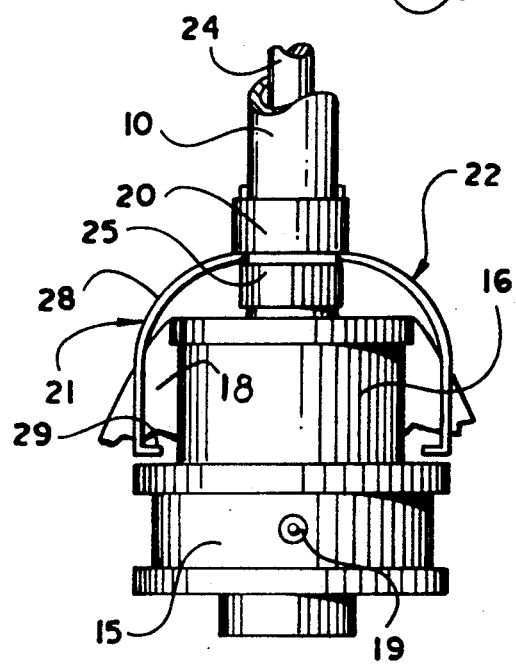

ANTI-WRAP BLADES FOR LINE TRIMMER

INFORMATION DISCLOSURE STATEMENT

The line trimmer has become a very popular lawn and garden tool, and owners of line trimmers try to use the trimmers for a great variety of jobs. Due to the great popularity of line trimmers (frequently known by the trademark "Weed Eater"), many variations have been made, and various adapters have been created.

A task that must frequently be performed is the cutting of very tall grass or weeds. Whether in a rural setting wherein the vegetation may never have been cut, or in an urban setting wherein the vegetation may not have been cut for a long time, very tall vegetation presents a problem. When a conventional line trimmer is used to cut tall vegetation, the severed stalks, propelled by the rotary cutting action, wrap around the support of the trimmer. Very quickly, the vegetation becomes so entangled around the line trimmer that rotation of the driven hub is stopped. In the case of a combustion engine, the engine will be choked down; in the case of an electric motor, the engine will cease to rotate. In either case, of course, the operator must stop to unwrap the vegetation to allow the driven hub to operate properly. On resuming cutting of tall vegetation, the severed vegetation will once again wrap around the device and prevent operation of the trimmer.

In view of the above discussed problems, tall vegetation is most commonly cut with hand operated apparatus such as a scythe or a swing blade, which are slower and require much greater physical exertion by the user.

SUMMARY OF THE INVENTION

This invention relates generally to line trimmers, and is more particularly concerned with secondary cutting blades mounted on a line trimmer for preventing wrapping of vegetation on the trimmer.

The present invention provides at least one secondary cutting blade stationarily held adjacent to the rotating hub of a line trimmer so that tall vegetation cut by the line will be again cut by the secondary cutting blades. Because the stalk of the severed vegetation is cut again after it is severed, the stalk is unable to wrap around the shaft of the line trimmer, so there is no problem with choking the trimmer.

In the preferred form of the invention, the secondary cutting blades extend from a point adjacent to the supporting shaft of the line trimmer, and curve out and down to terminate adjacent to the upper periphery of the line-carrying hub. Thus, any vegetation that may tend to wrap around the stationary portions of the trimmer will engage the secondary cutting blades and be cut again, thereby preventing wrapping of the vegetation. Two of the secondary cutting blades may be spaced apart 180°. Such spacing yields enough blades to assure cutting of substantially all the vegetation, while allowing sufficient space between blades to allow entry of the vegetation to the cutting edges.

BRIEF DESCRIPTION OF THE DRAWINGS

These and other features and advantages of the present invention will become apparent from consideration of the following specification when taken in conjunction with the accompanying drawings in which:

FIG. 1 is a perspective view showing a conventional line trimmer having anti-wrap blades made in accordance with the present invention mounted thereon;

FIG. 2 is an enlarged, side elevational view showing the anti-wrap blades depicted in FIG. 1;

FIG. 3 is a view similar to FIG. 2, but showing a front elevational view; and,

FIG. 4. is an enlarged, fragmentary view showing a modified mounting means for the anti-wrap blades.

DETAILED DESCRIPTION OF THE EMBODIMENTS

Referring now more particularly to the drawings, and to those embodiments of the invention here shown by way of illustration, FIG. 1 illustrates a generally conventional line trimmer including a support shaft 10 carrying an engine 11 on one end and the cutter unit 12 on the opposite end. Centrally of the shaft 10, there may be a guide member 14 to aid in controlling the motion of the cutter unit 12.

The cutter unit 12 here shown by way of example comprises a driven, rotatable hub 15 adjacent to a stationary hub 16. A shield 18 extends from the stationary hub 16 to be interposed between the hub 15 and the operator of the device. A line 19 extends outwardly from the hub 15, the line 19 being driven with the hub 15 to effect the intended cutting.

The above described line trimmer is conventional, and well known in the art. It will be recognized by those skilled in the art that, when tall vegetation is severed by the line 19, the upper stalk will be propelled in a rotational direction, so the stalk tends to wrap around the stationary hub 16. With continued use, wrapped stalks will build up on the hub 16, somewhat confined by the shield 18, until the stalks bear against the driven hub 15. When sufficient pressure is exerted on the hub 15, the drag will overcome the torque exerted by the engine 11, and the device will be stopped.

The precise apparatus here shown includes a combustion engine 11 which is normally mounted on the upper end of the shaft 10, and a flexible drive member extends from the engine 11 to the cutter unit 12. Those skilled in the art will realize that some line trimmers use electric motors, and the electric motor is usually mounted on the lower end of the support shaft 10. The cutter unit is then carried directly on the shaft of the motor. Though the precise structure is somewhat different from that shown in the drawings, the problem is the same, and the anti-wrap blades of the present invention are equally adaptable to the electric line trimmers.

Looking at the cutter unit 12 in more detail, it can be seen in FIG. 1 that there is a collar 20 on the support shaft 10 adjacent to the cutter unit 12. The collar 20 fixes a pair of secondary cutter blades 21 and 22 to the cutter unit 12. Each of the secondary cutter blades 21 and 22 curves out and down, enveloping the stationary hub 16.

For a better understanding of the secondary cutting blades 21 and 22, attention is directed to FIGS. 2 and 3 of the drawings. It can here be seen that the support shaft 10 has a drive member 24 passing therethrough to drive the driven hub 15. A clamp 25 is provided to fix the cutter unit 12 to the shaft 10, but it should be understood that this is only one form of conventional construction. The shield 18 is shown fragmentarily.

Looking at FIGS. 2 and 3 together, it will be understood that the secondary cutting blades 21 and 22 include upper tangs 26 that are held by the clamp member 20 to the support shaft 10, to hold the cutting blades 21 and 22 in the desired position, and stationary with respect to the shaft 10. The blades then extend out and down at 28 to envelop the stationary hub 16. Finally, the blades 21 and 22 terminate closely adjacent to the upper periphery of the driven hub 15. As here shown, the ends of the cutter turn inwardly at 29 to assist in preventing vegetation from approaching the hub 16 without being engaged by the cutters 21 and 22.

With the above description in mind, operation of the device of the present invention should be understood. The engine 11 causes rotation of the driven hub 15, which moves the line 19 in a circular path. When the line 19 engages vegetation, the vegetation will be cut, and the severed stalk will tend to move in a circular path because of the circular motion of the line 19 and of the hub 15. Conventionally, the circular motion of the severed stalks causes the stalks to wrap around the stationary hub 16; however, with the secondary cutting blades of the present invention enveloping the hub 16, the rapidly moving vegetation will engage at least one of the cutter blades 21 and 22 and will be cut again. It will be realized that the secondary cutting blades 21 and 22 envelop the precise area that tends to become wrapped with vegetation, so cutting of the vegetation rather than wrapping is most likely.

The secondary cutting blades of the present invention are confined to the area of the stationary hub, or between the driven hub 15 and the shield 18. This is the area in which wrapping is troublesome. If vegetation wraps around the shaft 10 above the shield 18, there is so much space that the vegetation could not become sufficiently jammed to cause drive problems. Thus, the object of the present invention is to cut stalks that may tend to wrap around the device in the area between the driven hub and the stationary shield.

FIGS. 1-3 illustrate one convenient mounting means for the secondary cutting blades of the present invention, but those skilled in the art will realize that numerous other mounting means will serve as well. For example, rather than having the upwardly directed tang 26, the tang may be directed down and received under the clamp 25. Another arrangement is shown in FIG. 4.

In FIG. 4, equivalent parts carry the same reference numerals, and the secondary cutting blade is designated at 21A. In FIG. 4, the stationary hub 16 is provided with blocks such as the block 30 which may be fixed to the hub 16. The tang 26A of the blade 21A is then fixed to the block 30 by a screw 31. The secondary cutting blade 21A is otherwise like the cutting blades 21 and 22, and the operation is the same.

Instead of having the block 30 fixed to the hub 16, the block 30, or some equivalent structure, may be carried by the clamp 25. Again, the structure and operation of the blade 21A will be the same as the blades 21 and 22.

The present invention therefore provides secondary cutting blades for a line trimmer, the secondary cutting blades enveloping the area of the line trimmer between the driven hub and the stationary shield. As a result of this construction, any vegetation that tends to wrap around the stationary portion of the trimmer will be moved against at least one of the secondary cutting blades, so the cutting blades act as an anti-wrap device. The cutting blade may of course have a chisel edge, a double-tapered knife edge, serrated edges or the like. The object is only to assure that severed vegetation is again cut by the secondary cutting blades so the severed vegetation cannot wrap around the stationary portions of the line trimmer.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention, as outlined in the appended claims.

I claim:

1. In a line trimmer comprising a support shaft, a cutter unit generally at one end of said support shaft, and an engine for operating said cutter unit, said cutter unit including a rotatable hub carrying a line for cutting vegetation, and a shield above said rotatable hub, the improvement comprising at least one secondary cutting blade, said secondary cutting blade having a first end substantially at the periphery of said rotatable hub, said secondary cutting blade extending up from said first end and curving towards said support shaft and terminating adjacent to said support shaft, the arrangement being such that vegetation attempting to wrap around said support shaft between said rotatable hub and said shield will be cut by said secondary cutting blade.

2. In a line trimmer comprising a support shaft, a cutter unit generally at one end of said support shaft, and an engine for operating said cutter unit, said cutter unit including a rotatable hub carrying a line for cutting vegetation, and a shield above said rotatable hub, the improvement comprising at least one secondary cutting blade, said secondary cutting blade having a first end substantially at the periphery of said rotatable hub, said secondary cutting blade extending throughout the space between said rotatable hub and said shield, the arrangement being such that vegetation attempting to wrap around said support shaft between said rotatable hub and said shield will be cut by said secondary cutting blade, the further improvement wherein said at least one secondary cutting blade comprises a plurality of secondary cutting blades, said plurality of secondary cutting blades being equally distributed around said rotatable hub.

3. In a line trimmer as claimed in claim 2, the improvement including clamping means on said support shaft adjacent to said shield, said secondary cutting blades having a second end adjacent to said support shaft and held by said clamping means.

4. In a line trimmer as claimed in claim 2, wherein said cutter unit includes a stationary hub above said rotatable hub, said stationary hub substantially filling said space between said rotatable hub and said shield, said secondary cutting blade having a second end opposite said first end, the improvement comprising means for fixing said second end of said secondary cutting blade to said stationary hub.

5. In a line trimmer as claimed in claim 4, said means for fixing said second end of said secondary cutting blade to said stationary hub including a block fixed to said stationary hub, and screw means for fixing said second end of said secondary cutter blade to said block.

6. In a line trimmer as claimed in claim 4, wherein said stationary hub includes second clamping means for holding said cutter unit to said support shaft, said means for fixing said second end of said secondary cutting blade to said stationary hub comprising said second clamping means, said second end of said secondary cutting blade being held by said second clamping means.

7. In a line trimmer as claimed in claim 3, the improvement wherein said plurality of secondary cutting blades comprises two secondary cutting blades located diametrically from each other with respect to said rotatable hub.

* * * * *